June 2, 1936.  O. V. LEMAY  2,042,945
MEASURING SPOON
Filed May 17, 1934
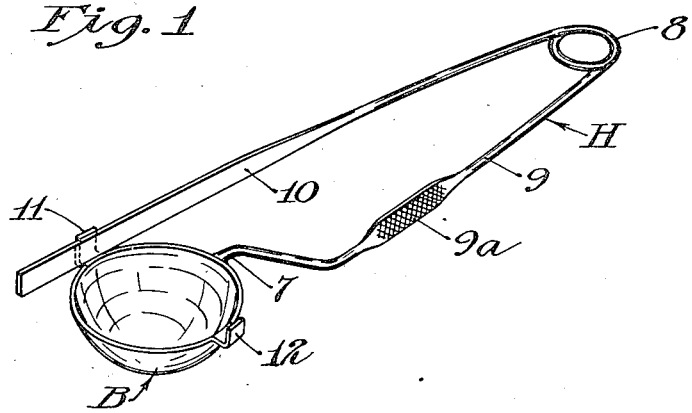
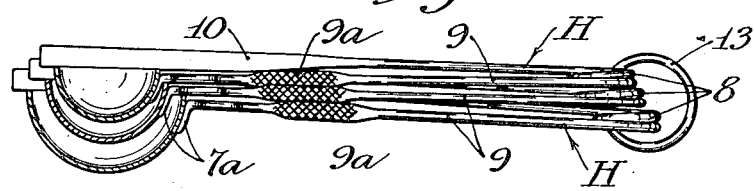
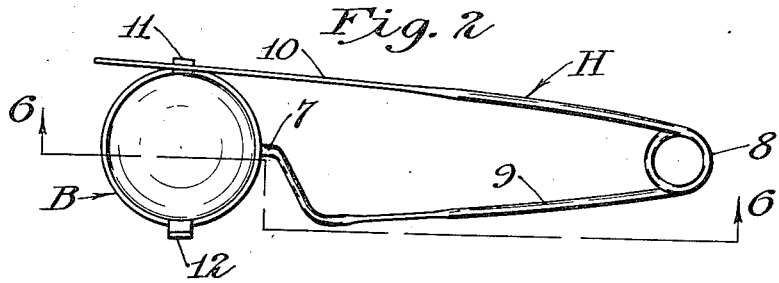
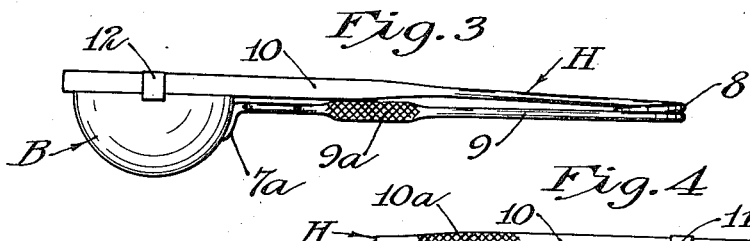
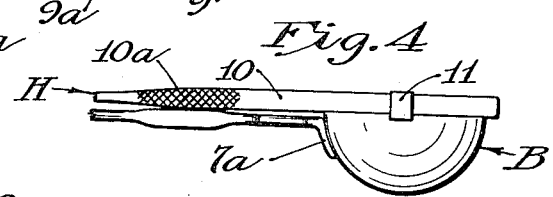
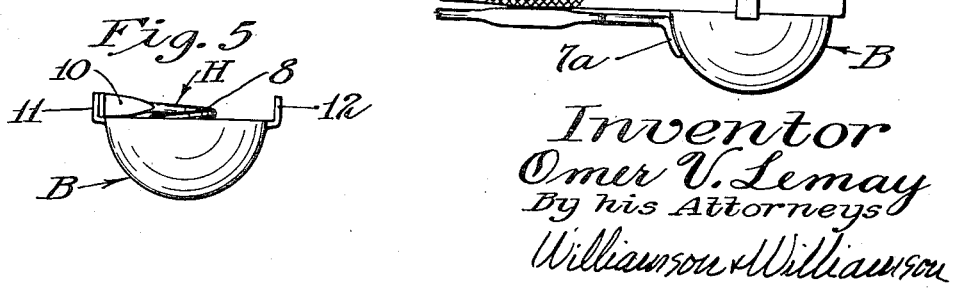
Inventor
Omer V. Lemay
By his Attorneys
Williamson & Williamson Patented June 2, 1936

2,042,945

UNITED STATES PATENT OFFICE 2,042,945

MEASURING SPOON

Omer V. Lemay, Minneapolis, Minn.

Application May 17, 1934, Serial No. 726,105

6 Claims. (Cl. 73—62)

My invention relates to kitchen utensils and particularly to measuring spoons having leveling means combined therewith.

In using ordinary measuring spoons it is necessary to employ some other utensil having a straight edge in leveling the material being measured therein when a level spoonful is required.

It is an object of my invention to provide a measuring spoon having incorporated therewith a leveling means.

Another object is to provide such a measuring spoon wherein the leveling means, when operated, will automatically maintain proper contact with the rim of the spoon.

Still another object is to provide such a measuring spoon wherein the leveling means will automatically return from its operated position to its unoperated or normal position when released after an operation.

Yet another object is to provide such a measuring spoon wherein certain portions are common to the handle and the leveling means thereof.

A further object is the provision of simple, inexpensive measuring spoons of the class described, which, through their construction, enable a set of several spoons for measuring various quantities of material to be compactly nested and connected together as a unit.

These and other objects and advantages of the invention will be more fully set forth in the following description made in connection with the accompanying drawing, in which like reference characters refer to similar parts throughout the several views, and in which:—

Fig. 1 is a perspective view showing one of my measuring spoons detached from a set;

Fig. 2 is a top plan view of the same;

Fig. 3 is a side elevation;

Fig. 4 is an opposite side elevation;

Fig. 5 is an end elevation of the detached measuring spoon, and

Fig. 6 is a sectional view through a set or unit of connected measuring spoons of several different sizes taken along a line related to said set in accordance with the line 6—6 of Fig. 2.

As shown in the drawing, my improved construction is particularly adapted for the nesting of a set of different sized spoons into a compact, connected unit. The handles, leveling elements and resilient means for all spoons of a set may be of uniform or common construction.

Since the structure of each spoon of a set is identical with the exception of dimensions and size of the measuring bowl, the details of only one thereof will be described.

In the embodiment of the invention shown in the drawing, each measuring spoon comprises two essential parts, first a measuring bowl indicated as an entirety by the letter B, with, as shown, integrally formed stops or abutments and an integrally formed handle and leveling member indicated as an entirety by the letter H. The member H is preferably made from resilient material, such as spring metal bent to form a substantially U-shaped handle portion provided with an off-set extremity 7 which is rigidly secured to the measuring bowl B. Any suitable securing means may be employed and, as shown, the off-set portion 7 has a down-turned attachment extremity 7a which is spot-welded to the exterior and handle portion of the bowl B. The medial and outer portion of the handle and leveling member H may, if desired, be formed in a spiral coil 8 to increase the flexibility and resiliency between the shank portion 9 of said member and the leveling element 10. The leveling portion or element 10, as shown, comprises the free end of member H and is preferably flattened to afford a lower longitudinal straight edge which is urged resiliently against the peripheral edge of bowl B. The outwardly disposed surface of leveling portion 10 is roughened or knurled, as shown at 10a, to provide a gripping surface which may be engaged by the forefinger of the hand, while the thumb of the same hand engages a roughened or knurled surface 9a provided on a flattened portion of the shank 9. The integrally formed handle H is constructed and bent in such manner that leveling element 10 is resiliently urged outwardly to its extreme position in abutment with the stop 11 provided at one side of the measuring bowl B. Stop 11, as shown, is integrally formed with the bowl and slightly offset therefrom to allow for the thickness of the leveling portion of element 10. A second upstanding stop 12, as shown, also integrally formed with bowl B is disposed diametrically to stop 11 and is likewise offset somewhat from the peripheral edge of the bowl to limit the cross swinging movement of the leveling element when the same is swung by a pressure of the forefinger across the measuring bowl. The measuring element or portion 10 is so bent and formed from the member H that its lower edge will be urged into contact with the peripheral edge of bowl B.

In Fig. 6 a set of my improved measuring spoons is illustrated disposed in compact or nested relation, each of the measuring bowls thereof being of different dimension. The combined handle and leveling members of the several bowls may be of identical construction and are all connected by suitable means such as a ring 13 which passes through the spiral coils or eyes of the several measuring spoons.

In operation, assuming a series of measuring spoons of different capacities being connected as a unit, the desired spoon is selected and the others swung rearwardly therefrom and the selected spoon is then grasped between the thumb and forefinger of the human hand with the thumb applied at the roughened surface 9a of the shank and the forefinger engaged with the roughened surface 10a of the measuring portion. The bowl is then dipped into the material to be measured, whereafter the leveling portion is swung across the upper edge of the bowl B by placing pressure thereon in the direction of the shank 9, the straight edge of the leveling element traversing the entire edge of the bowl and scraping off all material disposed above the peripheral edge of the bowl whereby an accurate measurement of the material is assured. Upon releasing the pressure between the thumb and forefinger the leveling portion 10 returns to its normal position, indicated in Fig. 1 in abutment with the stop 11. The contents of the bowl may then be poured as desired.

The several measuring spoons of a set may be quickly selected as desired and separated from the other spoons and utilized in the manner previously described. The bowls B of various capacities may each be stamped or otherwise constructed from integral pieces of material and the stops 11 and 12 may be integrally formed from the stock of the bowl B.

From the foregoing description it will be seen that I have provided an inexpensive and highly efficient measuring spoon having leveling means associated therewith which assures uniform and accurate measurement of material and which enables a compact unit or set of spoons of different capacities to be connected for convenient use.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What is claimed is:—

1. A measuring spoon including a bowl and a resilient, substantially U-shaped handle member, the end of one leg of said member being affixed to said bowl and the free end portion of the other leg of said member being formed into a straight edged leveling element engaging the edge of said bowl and being adapted to be swung transversely of said bowl.

2. A measuring spoon including a bowl and a resilient U-shaped handle member, the end of one leg of said member being secured to said bowl and the free end portion of the other leg of said member being formed into a straight edged leveling element engaging the edge of said bowl and being adapted to be swung transversely of said bowl, said resilient member being so tensioned as to urge said leveling element toward one side of said bowl.

3. The structure defined in claim 2 and means for limiting outward movement of said leveling element with respect to said side of the bowl.

4. A measuring spoon including a bowl and a combination handle and leveling member of substantially U-shape, one end of said member being affixed to said bowl and the other or free end of said member being extended at its extremity above the edge of said bowl and being formed into a straight edged leveling element and positioned for transverse swinging across said bowl, a stop on said bowl for limiting movement of said leveling element in one direction and a stop on the opposite side of said bowl for limiting swinging movement of said leveling element in the opposite direction and means for urging said leveling element toward one of its respective limits of movement.

5. A measuring spoon including a bowl and a resilient generally U-shaped handle member, the end of one leg of said member being affixed to said bowl and the free end portion of the other leg of said member being formed into a straight edged leveling element engaging the edge of said bowl and being adapted to be swung transversely of said bowl, a stop element formed integrally with said bowl and projecting upwardly from the edge thereof to limit outward movement of said leveling element with respect to one side of said bowl, said resilient member being so tensioned as to urge said leveling element toward said stop element.

6. A measuring spoon including a bowl, a generally U-shaped resilient member affixed at one of its free ends to said bowl and being formed at its remaining free end portion into a straight edged leveling element adapted for swinging movement transversely across the rim portion of said spoon and stop means for limiting outward movement of said leveling element with respect to one side of said bowl, said resilient member being tensioned to simultaneously maintain said leveling element in firm contact with the rim portion of said bowl and urge said leveling element toward said stop means.

OMER V. LEMAY.